United States Patent
Berglund et al.

(10) Patent No.: US 6,854,786 B2
(45) Date of Patent: Feb. 15, 2005

(54) A-PILLAR AND ROOF SIDE SECTION HOUSING A SEAL FOR VEHICLE OF SASH-LESS DOOR TYPE

(75) Inventors: Göran Berglund, Gammelstad (SE); Ingemar Wallström, Göteborg (SE); Mats Lindberg, Luleå (SE)

(73) Assignee: Accra Teknik AB, Ojebyn (SE)

( * ) Notice: Subject to any disclaimer, the term of this patent is extended or adjusted under 35 U.S.C. 154(b) by 0 days.

(21) Appl. No.: 10/322,343

(22) Filed: Dec. 17, 2002

(65) Prior Publication Data

US 2003/0122400 A1 Jul. 3, 2003

(30) Foreign Application Priority Data

Dec. 18, 2001 (SE) .......................................... 0104275-3

(51) Int. Cl.[7] .............................................. B60J 10/08
(52) U.S. Cl. ................. 296/146.9; 296/93; 296/193.06; 49/475.1; 49/483.1; 49/489.1
(58) Field of Search .............................. 296/146.9, 93, 296/193.06, 203.03, 193.05, 203.01, 202, 202.02, 201, 96.21, 146.15; 49/475.1, 483.1, 489.1

(56) References Cited

U.S. PATENT DOCUMENTS

| | | | |
|---|---|---|---|
| 1,444,885 A | 2/1923 | Potter | 296/93 |
| 1,524,710 A | 2/1925 | Hill | 296/93 |
| 4,653,801 A | 3/1987 | Shirasu et al. | 296/93 |
| 5,154,952 A | 10/1992 | Nozaki | 296/93 |
| 5,331,768 A | 7/1994 | Takeuchi | 49/475.1 |
| 5,346,273 A | 9/1994 | Takeuchi | 296/146.9 |
| 5,702,148 A | 12/1997 | Vaughan et al. | 296/146.9 |
| 6,536,833 B2 | 3/2003 | Nozaki | 296/146.9 |
| 2001/0015035 A1 * | 8/2001 | Nozaki | 49/489.1 |

FOREIGN PATENT DOCUMENTS

| | | |
|---|---|---|
| DE | 3738426 A1 | 5/1989 |
| JP | 61-215175 | 9/1986 |
| JP | 61-215176 | 9/1986 |
| JP | 63-68422 | 3/1988 |
| WO | WO 98/27235 A1 | 6/1998 |

* cited by examiner

*Primary Examiner*—Lori L. Coletta
(74) *Attorney, Agent, or Firm*—Ware, Fressola, Van der Sluys & Adolphson LLP

(57) ABSTRACT

A beam (2, 22) is provided for use as an A-pillar (21) and roof rail (1) of a vehicle. The beam is a closed profile elongated element defining a longitudinally extending recess (3, 23) for housing a weather strip (4, 24). The recess (3, 23) includes a base (14, 34), an inner wall (15, 35) and an outer wall (16, 36) and the weather strip (4, 24) is attached to the recess (3, 23). The weather strip (4, 24) is attached to the base (14, 34) of the recess by a double-sided adhesive tape (17, 37) pre-applied to the weather strip (4, 24) which adheres to the base of the recess on contact or by application of pressure.

5 Claims, 2 Drawing Sheets

A-PILLAR AND ROOF SIDE SECTION HOUSING A SEAL FOR VEHICLE OF SASH-LESS DOOR TYPE

BACKGROUND OF THE INVENTION

1. Technical Field

The present invention relates to A-pillars and roof side sections primarily for vehicles of the type having sash-less (frameless) doors commonly found in sports cars such as cabriolets and coupes.

2. Description of the Background Art

In recent times increased demands have been placed on a number of areas relating to the structure and functionality of doors and windowpanes of motor vehicles. The doors are required to open and shut securely and safely in addition to the doors maintaining a securely seal with the body of the vehicle whilst in a closed position. Further demands are also imposed upon the interaction between the door and windowpane when the windowpane is raised or lowered whilst the vehicle is driven along at normal/high speeds. Car manufacturers have been presented with the problem of providing a seal between a sash-less windowpane of glass and the A-pillar/roof rail of the car body. When a car is driven along at normal driving speed the glass is under a load due to a pressure differential between the inside and outside of the car, which draws the glass out from the body of the car. For a sashtype door the glass load and movement is absorbed by the doorframe structure. If the integrity of the seal between the glass and the car body is damaged or affected, the result is leakage and noise and in order to avoid these undesirable effects, car manufacturers have provided a number of solutions. One such solution is to provide the door seal with a hooking function, which is normally provided by an outer lip. The lip stops the upper edge or contour of the glass pane moving outwards, away from the seal. Due to this hooking load on the seal, it is particularly important to have a secure connection between the lip and the A-pillar/roof section reducing the risk of the lip being pulled out from the pillar.

In one arrangement, the upper glass contour is designed to pass just under the seal hooking lip with an accurate clearance tolerance during opening and closing. Therefore, it is important that the seal support and mounting surfaces have accurate position tolerances. In the last phase of the door shutting procedure, the windowpane is straightened slightly into a more upright position and therefore extends into the recess between the hooking lip and the sealing surface of the weather strip. In another door shutting procedure, the glass pane is raised into the recess by the electric window elevator which raises the glass pane a short distance just after the door has reached a closed position. The glass pane is lowered a corresponding short distance by the electric window elevator in the door opening procedure, allowing the glass to pass just under the hooking lip of the weather strip when the door is opened.

A number of prior art patent specifications have provided apparatus for housing a seal in order to achieve the elimination of leakage and noise, the most relevant of which are discussed below.

In JP 63068422, the features of the invention enable a weather strip to be directly attached to a vehicle without use of a retainer although the abstract discloses a separate pressed part having a separate flange to clamp the seal in place. DE 3738426 discloses a u-shaped connecting profile mountable between a roof skin and a roof frame. The unshaped profile opens toward a car door and houses a seal by using an adhesive or a clamping action. JP 61215175 discloses an apparatus for a roof side structure. The invention uses a number of parts welded together to produce the roof rail section. JP 61215176 also discloses an apparatus for a front pillar. The structure is similar to the structure used in JP 61215175 comprising a number of welded parts to provide the A-pillar. The general problem associated with solutions disclosed in the prior art is the complexity of the overall structure due to a plurality of separate manufactured pieces being fixed together to provide a useful component.

SUMMARY OF THE INVENTION

It is an object of the present invention to reduce the complexity of the structure of A-pillars and roof rails thereby reducing the production costs and weights while maintaining the functionality required to absorb impacts and house a weather strip.

Accordingly, the present invention provides a beam for use as an A-pillar and/or roof rail of a vehicle comprising a closed profile elongate element defining a longitudinally extending recess for housing a weather strip.

This simple construction removes the need for a complicated assembly of pressed parts and welded components associated with apparatus disclosed in the prior art. As the component is preferably roll formed and longitudinally welded to a closed section in a conventional, roll-forming line followed by forming of the straight profile part into a curved A-pillar or roof-side beam, accurate tolerances can be obtained for dimensions of the beam. Extra retainer parts and assemblies for the A-pillar and roof side section have a negative impact on the desired tolerances and should be avoided.

The weight reduction is partly achieved by integrating the recess for housing the weather strip into the A-pillar or roof side section. All material forming the recess is fully active in the A-pillar and roof side structure. A separate retainer part has no structural function therefore the extra weight together with the retainer part are deleted from the structure.

The substantial costs associated with extra retainer parts such as mounting and mastic-sealing costs are avoided. The A-pillar/roof side section with the recess as an undercut is preferably manufactured by roll forming a boron steel material followed by hot bending and simultaneously hardening the boron steel material producing a beam having an ultra-high yield strength, making considerable weight reduction possible. The preferable method of manufacturing the beam is similar to the process described in International Patent Publication No. WO 98/27235 A1 in relation to the heat treating and quenching of the beam of the present invention and the contents of the International Patent Application are incorporated herein by reference thereto. The structural integrity requirements for A-pillars and roof rails are met by use of this special manufacturing process.

Production costs and weight are both reduced by forming a front pillar and roof side section member with an integrated recess for housing and hooking the door seal (weather strip) without any use of an extra retainer part or other assembled parts. Also sealing and assembly costs and their associated problems are avoided and precision of the door seal position at the car body side is increased.

In one embodiment, the recess comprises a base, an inner wall and an outer wall.

Preferably, a weather strip is attached to the recess.

Ideally, the weather strip is attached to the base of the recess by adhesive.

Preferably, the adhesive is a double-sided adhesive tape pre-applied to the weather strip, which adheres to the base of the recess on contact or by application of pressure. This tape will also prevent any air leakage between the weather strip and the base of the recess.

In a particularly preferred embodiment, the walls of the recess lean toward one another as they extend from the base of the recess. In this configuration, the weather strip is held in place and supported in the recess in order to withstand the twisting moment created by the glass load against the hooking lip of the weather strip.

In a particularly preferred embodiment, the inner wall of the recess lean toward the outer wall which is substantially perpendicular to the base.

BRIEF DESCRIPTION OF DRAWINGS

The invention will now be described with reference to the accompanying drawings, which show by way of example only one embodiment of a beam in accordance with the invention. In the drawings.

DETAILED DESCRIPTION OF THE INVENTION

Figure 1:
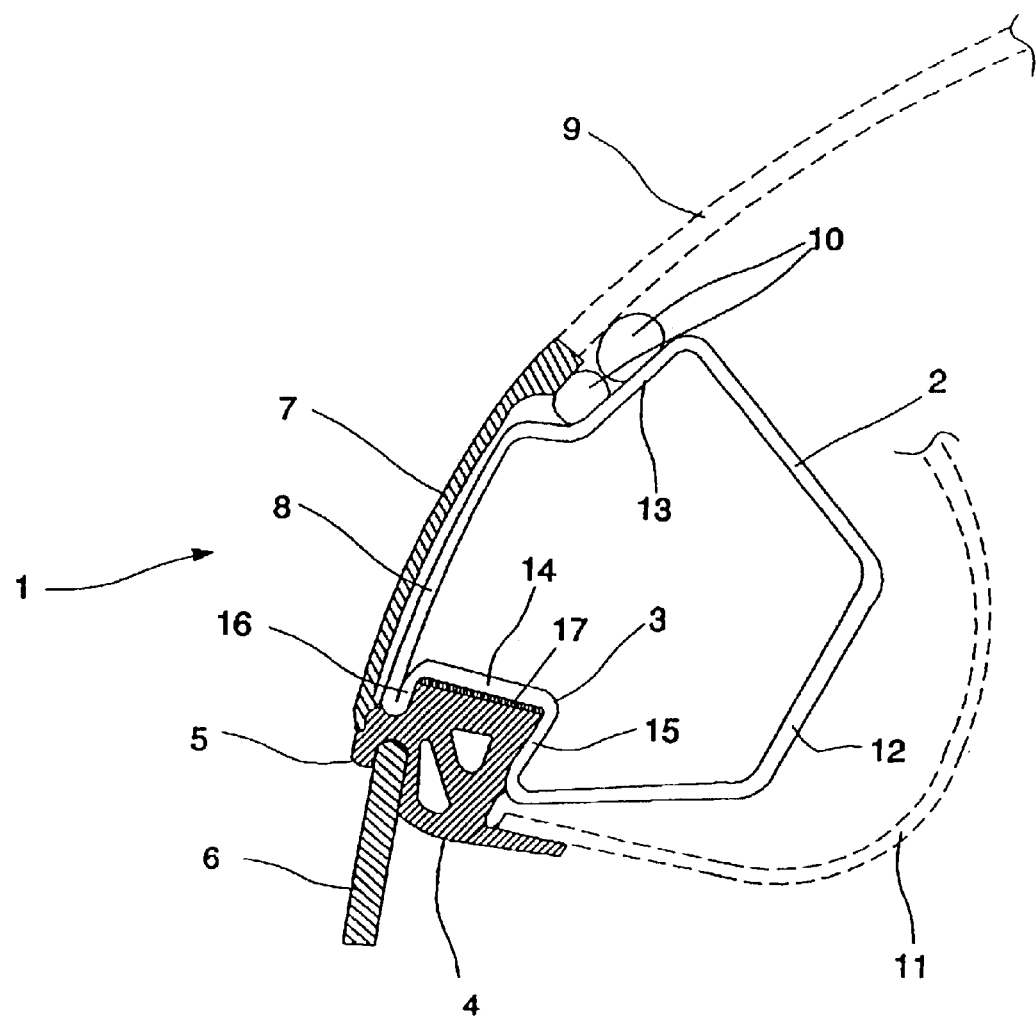
FIG. 1 is a section view of a roof pillar of a vehicle.

Referring to the drawings and initially to FIG. 1 there is shown a roof rail indicated generally by the reference numeral 1. The roof rail 1 is provided by a closed profile beam 2 having an integrally formed recess 3. A weather strip 4 is housed in the recess 3 and the weather strip 4 includes a hook formation 5. The hook formation 5 is formed for engagement with a pane of glass 6 held in place within a car door (not shown). An exterior panel 7 extends across the external surface 8 of the beam 2 from the weather strip 4 to a meeting point with the roof skin 9. The external surface 8 of the beam defines a depressed area 13 for housing a number of attachment members 10 for mounting the exterior panel 7 and the roof skin 9. A trim panel 11 encloses the internal surface 12 of the beam providing an aesthetically pleasing decor inside the vehicle. The trim panel 11 is mounted at one end to a section of the weather strip 4 and to a suitable mounting point (not shown) inside the vehicle. The recess 3 associated with the beam 2 has a base 14, an inside wall 15 and an outside wall 16. Inside wall 15 leans toward outside wall 16 as it extends from the base 14 providing a clamping effect to retain the weather strip 4 in the recess 3. Outside wall 16 is substantially perpendicular to the base 14. A double-sided adhesive tape 17 is pre-applied to the base of the weather strip 4 and is suitable for adhering to the base 14 of the recess 3.

Figure 2:
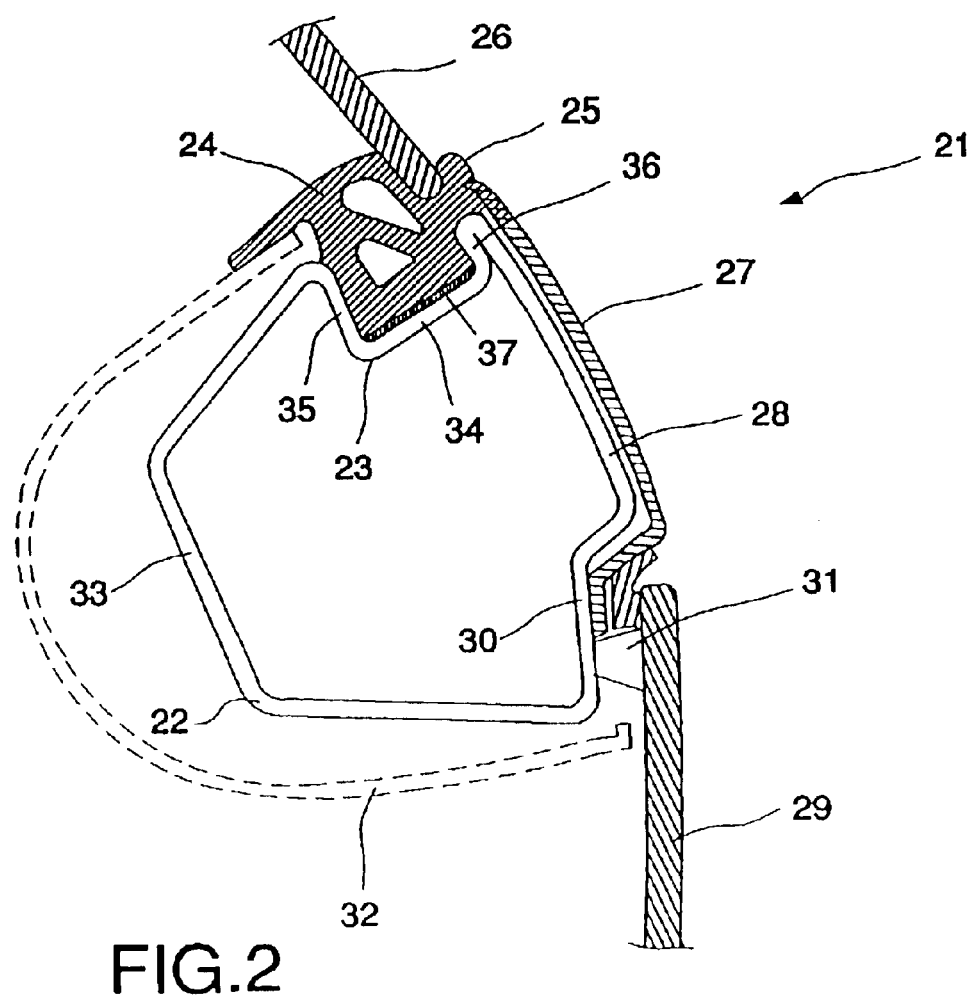
FIG. 2 is a section view of an A-pillar of a vehicle.

Referring to the drawings and now to FIG. 2, there is shown an A-pillar indicated generally by the reference numeral 21. The A-pillar 21 is provided by a closed profile beam 22 having an integrally formed recess 23. A weather strip 24 is housed in the recess 23 and the weather strip 24 includes a hook formation 25. The hook formation 25 is formed for engagement with a pane of glass 26 held in a car door (not shown). An exterior panel 27 extends across the external surface 28 of the beam 22 from the weather strip 24 to a point behind the front window screen 29. The external surface 28 of the beam 22 defines a depressed area 30 for housing an attachment member 31 for mounting the front window screen 29. A trim panel 32 encloses the interior surface 33 of the beam 22 inside the vehicle (not shown). The trim panel 32 is mounted at one end to a section of the weather strip 24 formed for engagement with the trim panel 32 and connected to the A-pillar/roof section at the other end a short distance from glass 29. The recess 23 associated with the beam 22 has a base 34, an inside wall 35 and an outside wall 36. Inside wall 35 leans toward outside wall 36 as it extends from the base 34. Outside wall 36 is substantially perpendicular to the base 34. A double-sided adhesive tape 37 is pre-applied to the base of the weather strip 4 and is suitable for adhering to the base 34 of the recess 23.

Figure 3:
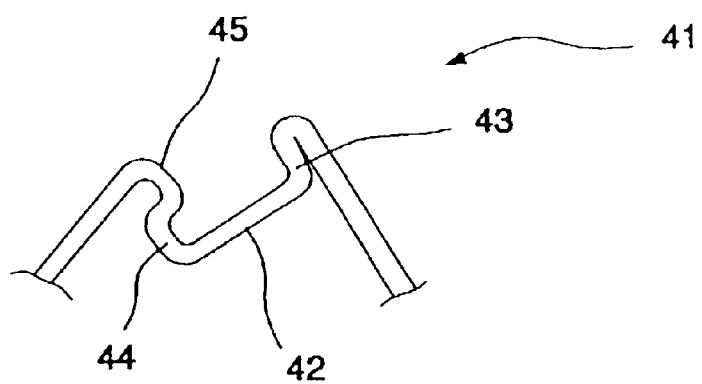
FIG. 3 is a partial section view of a second embodiment of recess for use in the roof pillar or A-pillar of FIG. 1 and FIG. 2 respectively.

Referring to the drawings and now to FIG. 3, there is shown a second embodiment of recess indicated generally by the reference numeral 41 having a base 42, an outer wall 43 and an inner wall 44. The inner wall 44 provides a hook 45 for retaining a weather strip 4, 24 (see FIGS. 1 and 2) within the recess 41.

It will of course be appreciated that the invention is not limited by the specific embodiments which are given by way of example only and that various alterations and modifications may be made to the embodiments without departing from the scope of the invention as defined in the appended claims.

What is claimed is:

1. A beam for providing a portion of a sashless door type vehicle chosen from the group consisting of a roof rail, an A-pillar and both a roof rail and an A pillar, the beam comprising:

a closed profile elongated element defining a longitudinally recess for housing a weather strip, the recess comprises a base, an inner wall and an outer wall, the inner and outer walls of the recess lean toward one another as they extend from the base, the inner wall of the recess includes a hook; and the weather strip attached to the base by dhesive and retained mechanically in the recess by the inner and outer walls leaning toward one another and by the hook.

2. A beam as claimed in claim 1, wherein the adhesive is double-sided adhesive tape pre-applied to the weather strip.

3. A beam as claimed in claim 2, wherein the weather strip is intended for cooperation with a sash-less window pane of glass.

4. A beam as claimed in claim 1, wherein the weather strip is intended for cooperation with a sash-less window pane of glass.

5. A beam as claimed in claim 1, wherein the inner wall of the recess leans toward the outer wall, the outer wall is substantially perpendicular to the base.

\* \* \* \* \*

UNITED STATES PATENT AND TRADEMARK OFFICE
CERTIFICATE OF CORRECTION

PATENT NO. : 6,854,786 B2
DATED : February 15, 2005
INVENTOR(S) : Göran Berglund, Ingemar Wallström Mats Lindberg It is certified that error appears in the above-identified patent and that said Letters Patent is hereby corrected as shown below:

Column 2,
Line 1, "unshaped" should be -- u-shaped --.

Column 4,
Line 36, "A pillar" should be -- A-pillar --.
Line 44, "dhesive" should be -- adhesive --.

Signed and Sealed this

Twenty-fourth Day of May, 2005

JON W. DUDAS
*Director of the United States Patent and Trademark Office*